(12) United States Patent
Xu

(10) Patent No.: US 9,720,502 B2
(45) Date of Patent: Aug. 1, 2017

(54) ELECTRONIC DEVICE AND METHOD FOR CONTROLLING VIBRATION OF ELECTRONIC DEVICE

(71) Applicant: Lenovo (Beijing) Co., Ltd., Beijing (CN)

(72) Inventor: Ben Xu, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 5 days.

(21) Appl. No.: 14/753,957

(22) Filed: Jun. 29, 2015

(65) Prior Publication Data
US 2016/0231813 A1 Aug. 11, 2016

(30) Foreign Application Priority Data
Feb. 10, 2015 (CN) .......................... 2015 1 0070608

(51) Int. Cl.
*H04B 3/36* (2006.01)
*G06F 3/01* (2006.01)
*G06F 3/0488* (2013.01)

(52) U.S. Cl.
CPC ............ *G06F 3/016* (2013.01); *G06F 3/0488* (2013.01)

(58) Field of Classification Search
CPC .................................. G06F 3/01; G06F 1/1652
USPC ................ 340/407.1, 582, 4.12, 7.6, 309.16; 345/156
See application file for complete search history.

(56) References Cited

U.S. PATENT DOCUMENTS

| 8,502,788 | B2 | 8/2013 | Cho |
| 8,654,075 | B2 | 2/2014 | Kim |
| 2009/0292990 | A1* | 11/2009 | Park ........................ G06F 3/016 715/702 |
| 2010/0117975 | A1 | 5/2010 | Cho |
| 2011/0095975 | A1* | 4/2011 | Hwang ................. G06F 1/1626 345/156 |
| 2012/0133621 | A1 | 5/2012 | Kim |
| 2013/0201093 | A1 | 8/2013 | Kim et al. |
| 2013/0265262 | A1* | 10/2013 | Jung ....................... G06F 3/041 345/173 |
| 2014/0028597 | A1 | 1/2014 | Cho et al. |

(Continued)

FOREIGN PATENT DOCUMENTS

| CN | 101739171 A | 6/2010 |
| CN | 102566816 A | 7/2012 |
| CN | 103576979 A | 2/2014 |

OTHER PUBLICATIONS

First Chinese Office Action regarding Application No. 201510070608.6 dated Feb. 20, 2017. English translation provided by Unitalen Attorneys at Law.

*Primary Examiner* — Phung Nguyen
(74) *Attorney, Agent, or Firm* — Harness, Dickey & Pierce, P.L.C.

(57) ABSTRACT

A method for controlling vibration of an electronic device having a flexible screen and a vibration driving unit, which includes: acquiring a folding parameter of the flexible screen; and adjusting a vibration parameter of the vibration driving unit in the electronic device according to the folding parameter. With the method according to the disclosure, the vibration parameter of the vibration driving unit in the electronic device may be adjusted to different folding states, so that the vibration energy generated by the vibration driving unit could be sensed.

9 Claims, 8 Drawing Sheets

(56) References Cited

U.S. PATENT DOCUMENTS

2014/0049463 A1      2/2014  Seo et al.
2014/0204037 A1*     7/2014  Kim ..................... G06F 1/1647
                                                        345/173
2015/0185787 A1*     7/2015  Choi .................... G06F 1/1677
                                                        345/156

* cited by examiner

ELECTRONIC DEVICE AND METHOD FOR CONTROLLING VIBRATION OF ELECTRONIC DEVICE

CROSS-REFERENCES TO RELATED APPLICATIONS

The present application claims priority to Chinese Patent Application No. 201510070608.6, filed with the State Intellectual Property Office of People's Republic of China on Feb. 10, 2015 entitled "VIBRATE ALERT METHOD AND ELECTRONIC DEVICE", the content of which is incorporated herein by reference in its entirety.

FIELD

The present disclosure relates to the technical field of electronic device, and in particular to an electronic device and a method for controlling vibration of an electronic device.

BACKGROUND

With development of the electronic technology, a flexible screen which is bendable and has good flexibility appears. An electronic device provided with the flexible screen also has good flexibility and can be folded freely.

Vibration of the electronic device is caused by vibration of an oscillator provided inside the electronic device according to a fixed vibration state parameter. Taking a mobile phone as an example, the oscillator of the mobile phone is generally located close to the center of the mobile phone. Therefore, the oscillator is wrapped in the flexible screen with multiple folding layers, after the electronic device is folded. If the electronic device is in a vibration mode, the vibration of the electronic device may not be sensed outside the electronic device, because the flexible screen has flexibility and the vibration energy generated when the oscillator vibrates according to the set vibration parameter.

SUMMARY

According to embodiments of the present disclosure, a method for controlling vibration of an electronic device is provided, the electronic device has a flexible screen and a vibration driving unit. The method includes:
acquiring a folding parameter of the flexible screen; and
adjusting a vibration parameter of the vibration driving unit according to the folding parameter.

Optionally, in the method as described above, the flexible screen of the electronic device is provided with a folding sensor for sensing folding information, and acquiring a folding parameter of the flexible screen includes:
acquiring the folding information from the folding sensor; and
obtaining number of times that the flexible screen is folded, according to the folding information.

Optionally, in the method as described above, the electronic device is provided with a counter, and the obtaining the number of times that the flexible screen is folded according to the folding information includes:
determining whether the folding information is received for the first time; and
controlling a counting number in the counter to be 1, if the folding information is received for the first time; and determining whether the folding information is received again in a pre-set time period, if the folding information is not received for the first time,
controlling the counting number in the counter to be incremented, if the folding information is received again in the pre-set time period; and
determining the counting number in the counter as the number of times that the flexible screen is folded, if no folding information is received in the pre-set time period.

Optionally, the method as described above further includes: resetting the counting number in the counter, after determining the counting number in the counter as the number of times that the flexible screen is folded.

Optionally, in the method as described above, adjusting a vibration parameter of the vibration driving unit of the electronic device according to the folding parameter includes:
determining whether the number of times that the flexible screen is folded is greater than a first pre-set threshold; and
adjusting the vibration parameter of the vibration driving unit from a first value to a second value, if the number of times that the flexible screen is folded is greater than the first pre-set threshold;
where the second value is greater than the first value.

Optionally, in the method as described above, adjusting a vibration parameter of the vibration driving unit of the electronic device according to the folding parameter includes:
determining whether the number of times that the flexible screen is folded is less than a second pre-set threshold; and
adjusting the vibration parameter of the vibration driving unit from a first value to a third value, if the number of times that the flexible screen is folded is less than the second pre-set threshold;
where the third value is less than the first value.

Optionally, in the method as described above, the flexible screen of the electronic device is provided with a sensor, and acquiring a folding parameter of the flexible screen includes:
acquiring data information from the sensor, where the data information includes coordinate information of the flexible screen corresponding to the data information; and
in a case that the data information is greater than a third pre-set threshold, determining that coordinate of the flexible screen corresponding to the data information is located in an outer side portion of a folded structure in the flexible screen, and recording the coordinate of the flexible screen corresponding to the data information as the folding parameter.

Optionally, in the method as described above, in a case that the sensor is an illumination sensor, acquiring data information from the sensor includes:
acquiring light intensity information from the illumination sensor, where the light intensity information includes the coordinate information of the flexible screen corresponding to the light intensity information and a light intensity value.

Optionally, in the method as described above, in a case that the sensor is a proximity sensor, acquiring data information from the sensor includes:
acquiring distance information from the proximity sensor, the distance information includes the coordinate information of the flexible screen corresponding to the distance information, and a distance between the proximity sensor and an object nearest to the proximity sensor.

Optionally, in the method as described above, in a case that the flexible screen is provided with a vibration driving unit group including at least two vibration driving units, adjusting a vibration parameter of the vibration driving unit of the electronic device according to the folding parameter includes:

acquiring position information for each of the vibration driving units in the electronic device;

determining a first vibration driving unit located in the outer side portion of the folded structure, according to the position information; and controlling the first vibration driving unit to vibrate and controlling the vibration driving unit other than the first vibration driving unit in the vibration driving unit group to stop vibrating.

According to embodiments of the present disclosure, an electronic device is provided, which includes: a flexible screen, a vibration driving unit, an acquiring module configured to acquire a folding parameter of the flexible screen; and an adjusting module configured to adjust a vibration parameter of the vibration driving unit according to the folding parameter.

Optionally, in the electronic device as described above, the flexible screen of the electronic device is provided with a folding sensor for sensing folding information, and the acquiring module includes:

a first acquiring unit, configured to acquire the folding information from the folding sensor; and a first processing unit, configured to obtain the number of times that the flexible screen is folded, according to the folding information.

Optionally, in the electronic device as described above, the electronic device is provided with a counter, and the first processing unit is configured to:

determine whether the folding information is received for the first time; and control a counting number in the counter to be 1, if the folding information is received for the first time;

determine whether the folding information is received again in a pre-set time period, if the folding information is not received for the first time, control the counting number in the counter to be incremented, if the folding information is received again in the pre-set time period; and determine the counting number in the counter as the number of times that the flexible screen is folded, if no folding information is received in the pre-set time period.

Optionally, in the electronic device as described above, the adjusting module includes:

a first determining unit, configured to determine whether the number of times that the flexible screen is folded is greater than a first pre-set threshold; and a first adjusting unit, configured to adjust the vibration parameter of the vibration driving unit from a first value to a second value, if the number of times that the flexible screen is folded is greater than the first pre-set threshold;

where the second value is greater than the first value.

Optionally, in the electronic device as described above, the adjusting module includes:

a second determining unit, configured to determine whether the number of times that the flexible screen is folded is less than a second pre-set threshold; and a second adjusting unit, configured to adjust the vibration parameter of the vibration driving unit from a first value to a third value, if the number of times that the flexible screen is folded is less than the second pre-set threshold;

where the third value is less than the first value.

Optionally, in the electronic device as described above, the flexible screen of the electronic device is provided with a sensor, and the acquiring module includes:

a second acquiring unit, configured to acquire data information from the sensor, where the data information includes coordinate information of the flexible screen corresponding to the data information; and a second processing unit, configured to determine that coordinate of the flexible screen corresponding to the data information is located in an outer side portion of a folded structure in the flexible screen, in a case that the data information is greater than a third pre-set threshold; and record the coordinate of the flexible screen corresponding to the data information as the folding parameter.

Optionally, in the electronic device as described above, in a case that the sensor is an illumination sensor, the second acquiring unit is configured to:

acquire light intensity information from the illumination sensor, where the light intensity information includes the coordinate information of the flexible screen corresponding to the light intensity information and a light intensity value.

Optionally, in the electronic device as described above, in a case that the sensor is a proximity sensor, the second acquiring unit is configured to:

acquire distance information from the proximity sensor, where the distance information includes the coordinate information of the flexible screen corresponding to the distance information, and a distance between the proximity sensor and an object nearest to the proximity sensor.

Optionally, in the electronic device as described above, in a case that the flexible screen is provided with a vibration driving unit group including at least two vibration driving units, the adjusting module includes:

a third acquiring unit, configured to acquire position information for each of the vibration driving units in the electronic device;

a third processing unit, configured to determine a first vibration driving unit located in the outer side portion of the folded structure, according to the position information; and a control unit, configured to control the first vibration driving unit to vibrate and control the vibration driving unit other than the first vibration driving unit in the vibration driving unit group to stop vibrating.

BRIEF DESCRIPTION OF THE DRAWINGS

In order to more clearly illustrate the technical solutions of embodiments of the disclosure, accompanying drawings used in the description of the embodiments are described below simply. Apparently, the accompanying drawings in the following description are only a few of embodiments of the disclosure. Other drawings may be obtained by those skilled in the art without any creative work based on the accompanying drawings provided herein.

DETAILED DESCRIPTION OF EMBODIMENTS

In the following, the technical solutions of the embodiments of the disclosure are described clearly and completely in conjunction with the accompany drawings of the embodiments of the disclosure. Apparently, the described embodiments are only part of embodiments of the disclosure. All other embodiments obtained by those skilled in the art based on the embodiments of the disclosure without any creative work belong to the scope of protection of the present disclosure.

Figure 1:
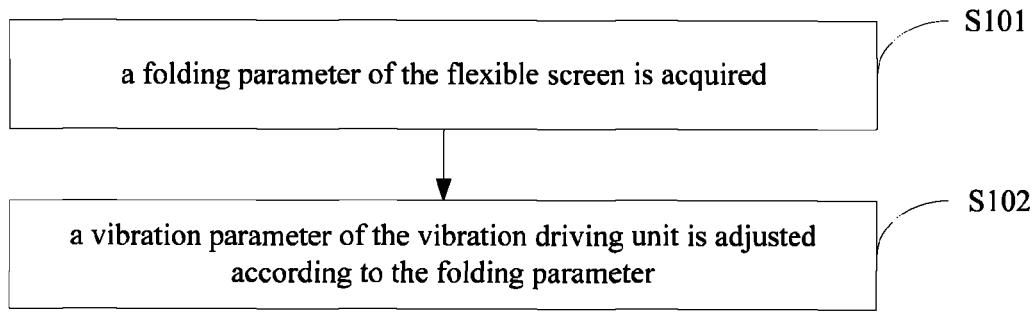
FIG. 1 is a flow chart of a method for controlling vibration according to an embodiment of the disclosure.

FIG. 1 shows a flow chart of a method for controlling vibration according to an embodiment of the disclosure. The method is applied to an electronic device including a flexible screen and a vibration driving unit. The vibration driving unit may vibrate according to a vibration state parameter. The electronic device may be a desktop, a notebook, a tablet PC, a mobile phone, a smart TV, a smart watch, a wearable device, etc.

The method is achieved by steps S101 and S102.

In step S101, a folding parameter of the flexible screen is acquired.

The flexible screen of the electronic device is folded multiple times and the vibration driving unit is wrapped in the flexible screen folded.

The folding parameter of the flexible screen is acquired, to determine the folding state of the flexible screen.

The folding parameter may include any parameter about the folding, such as the number of times that the flexible screen is folded, the area of the folding region, and the number of layers of the flexible screen folded.

In step S102, a vibration parameter of the vibration driving unit is adjusted according to the folding parameter.

The vibration parameter may include vibration frequency, vibration amplitude, etc. However, the vibration parameter is not limited thereto in the embodiment.

The folding state of the flexible screen may be determined according to the folding parameter. The vibration parameter of the vibration driving unit may be adjusted according to the folding state, to make the vibration of the vibration driving unit suitable for the folding state of the flexible screen and ensure that the vibration energy generated by the vibration driving unit is not completely absorbed by the flexible screen and can be transmitted to the outside of the electronic device.

In the method for controlling vibration according to the embodiment, the folding parameter of the flexible screen is acquired and the vibration parameter of the vibration driving unit in the electronic device is adjusted according to the folding parameter. With the method, the vibration parameter of the vibration driving unit in the electronic device may be adjusted to different folding states, so that the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

The flexible screen of the electronic device is provided with a folding sensor for sensing folding information.

Figure 2:
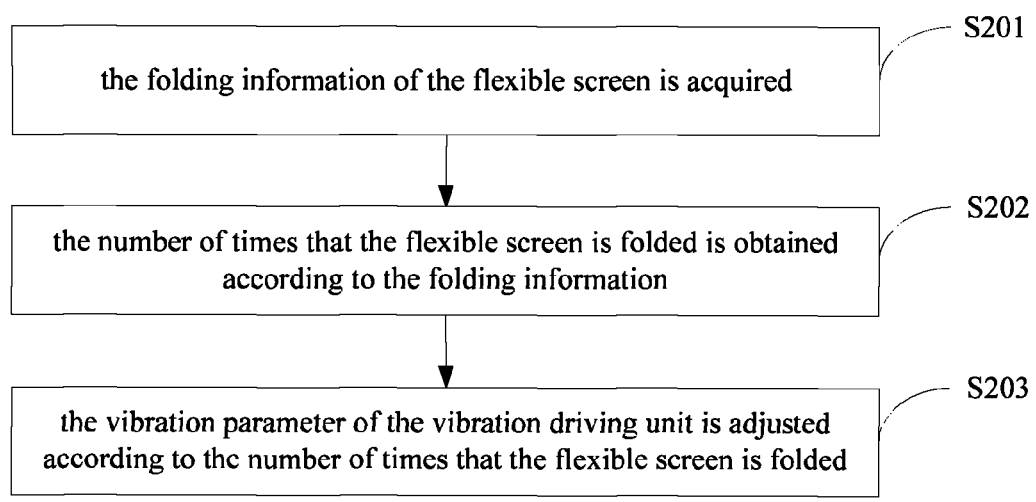
FIG. 2 is a flow chart of a method for controlling vibration according to an embodiment of the disclosure.

FIG. 2 shows a flow chart of a method for controlling vibration according to an embodiment of the disclosure. The method is achieved by steps S201 to S203.

In step S201, the folding information of the flexible screen is acquired.

The folding information indicates how flexible screen is folded.

The folding information may be any parameter information representing the way of folding, such as the coordinate of a folding position, the angle of folding and the area of the flexible screen.

In step S202, the number of times that the flexible screen is folded is obtained according to the folding information.

A calculation rule is pre-set in the electronic device, and the number of times that the flexible screen is folded is obtained based on the calculation rule and the folding information.

In practical application, the smaller the area of the flexible screen is, the lager the number of times that the flexible screen is folded is, and the larger the number of layers of the folded flexible screen is.

It should be noted that, the vibration driving unit is generally provided in the center of the electronic device. Therefore, in the case that the number of layers of the folded flexible screen is large, the vibration driving unit is wrapped by more layers of the folded flexible screen, and more vibration energy generated by the vibration driving unit is absorbed by the folded flexible screen.

In practical application, the energy absorption of the flexible screen may be determined according to the number of times that the flexible screen is folded. Then, the vibration parameter of the vibration driving unit may be adjusted according to the number of times that the flexible screen is folded, to make the vibration energy generated by the vibration driving unit not be completely absorbed by the flexible screen.

In step S203, the vibration parameter of the vibration driving unit is adjusted according to the number of times that the flexible screen is folded.

The step S203 is identical with the step S102 in the embodiment illustrated by FIG. 1, which will not be described herein.

In the method for controlling vibration according to the embodiment, the flexible screen of the electronic device is provided with the folding sensor for sensing the folding information. The number of times that the flexible screen is folded is obtained by analyzing the folding information collected by the folding sensor, and the vibration parameter of the vibration driving unit is adjusted according to the number of times that the flexible screen is folded. With the method, the vibration driving unit is adjusted in conjunction with the number of times that the flexible screen is folded, the vibration parameter of the vibration driving unit in the electronic device may be adjusted to different folding states, so that the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

The electronic device is further provided with a counter.

Figure 3:
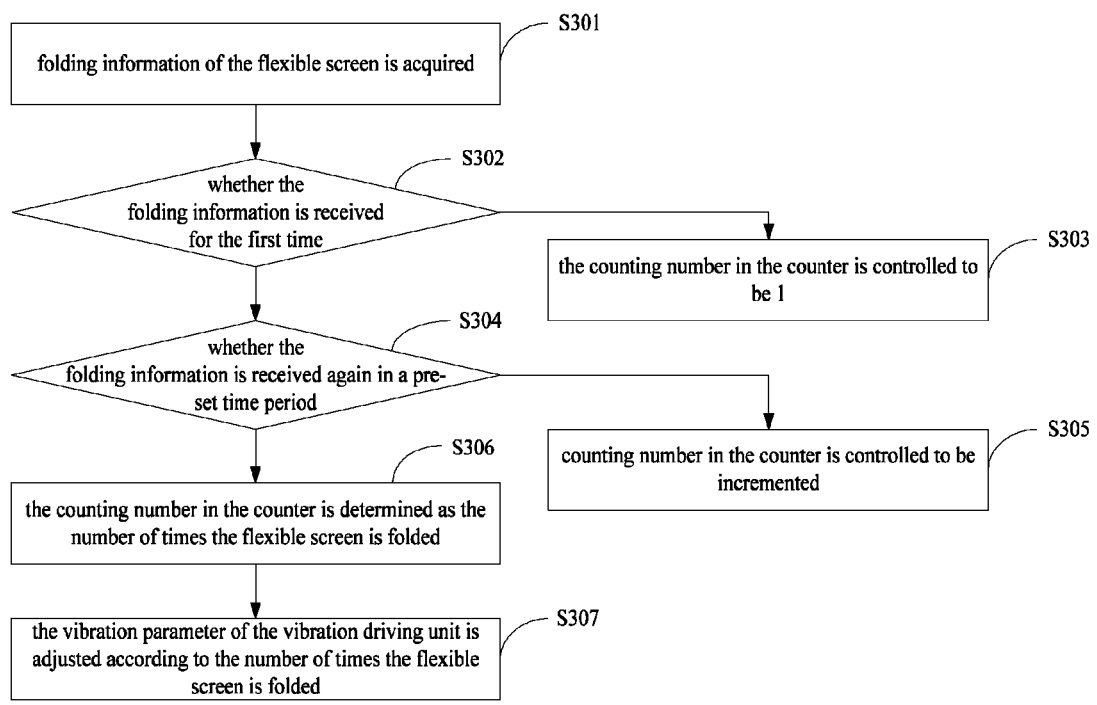
FIG. 3 is a flow chart of a method for controlling vibration according to an embodiment of the disclosure.

FIG. 3 shows a flow chart of a method for controlling vibration according to an embodiment of the disclosure. The method is achieved by steps S301 to S307.

In step S301, folding information of the flexible screen is acquired.

Step S301 is identical with step S201 in the embodiment illustrated by FIG. 2, which will not be described herein.

In step S302, it is determined whether the folding information is received for the first time.

The counter is configured to count the number of times that the folding information is received.

Every time the flexible screen is folded during the folding of the flexible screen, the folding information is received.

Whether the folding information is received for the first time, based on a pre-set judgment rule.

A counting number in the counter is initially zero. The counting number in the counter is read. In the case that the counting number in the counter is zero, the folding information is received for the first time. In the case that the counting number in the counter is not zero, the folding information is not received for the first time.

In step S303, the counting number in the counter is controlled to be 1, if the folding information is received for the first time.

In the case that the folding information is received for the first time, the counting number in the counter is controlled to be increased from zero to one, and it is continuously performed to receive the folding information. When the folding information is received again, the process goes on to step S304.

In step S304, it is determined whether the folding information is received again in a pre-set time period, if the folding information is not received for the first time.

The timing begins, when the folding information is not received for the first time. The timing stops, when the folding information is received again in the pre-set time period. Then, it is determined whether the timing is shorter than the length of the pre-set time period.

In practical application, the length of the pre-set time period is generally a small value, such as one minute or twenty seconds.

The step S305 is performed, if the folding information is received again in the pre-set time period; step S306 is performed, if no folding information is received in the pre-set time period.

In step S305, the counting number in the counter is controlled to be incremented, if the folding information is received again in the pre-set time period.

It should be noted that, in the case that the folding information is received again in the pre-set time period, the previous folding information and the current folding information may be regarded as the folding information generated from two folding actions in the same folding process, and both folding actions should be counted by the counter.

Therefore, the counting number in the counter is controlled to be incremented, and the folding action corresponding to the current received folding information is regarded as another folding action in the present folding process, if the folding information is received again in the pre-set time period.

In the step S306, the counting number in the counter is determined as the number of times that the flexible screen is folded, if no folding information is received in the pre-set time period.

It should be noted that, the folding process is regarded to be finished, if no folding information is received in the pre-set time period. Then, the current counting number in the counter is determined as the number of times that the flexible screen is folded and may be used in the following step to adjust a vibration parameter of the vibration driving unit according to the number of times that the flexible screen is folded.

It should be noted that, in practical application, the method further includes resetting the counting number in the counter, that is, setting the counting number to be zero, after the counting number in the counter is determined as the number of times that the flexible screen is folded. Thus, the counter may be reused and the next counting is not affected by the present counting.

In step S307, the vibration parameter of the vibration driving unit is adjusted according to the number of times that the flexible screen is folded.

Step S307 is identical with step S203 in the embodiment illustrated by FIG. 2, which will not be described herein.

In the method for controlling vibration according to the embodiment, the electronic device is provided with the counter. When the flexible screen is folded, the counting number of the folding process is incremented, every time the folding parameter generated in each folding action is received. When the folding process is finished, the number of times that the flexible screen is folded is determined according to the counting number for the folding process, and the vibration parameter of the vibration driving unit is adjusted according to the number of times that the flexible screen is folded. With this method, the vibration driving unit is adjusted in conjunction with the number of times that the flexible screen is folded, the vibration parameter of the vibration driving unit in the electronic device may be adjusted to different folding states, so that the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

Figure 4:
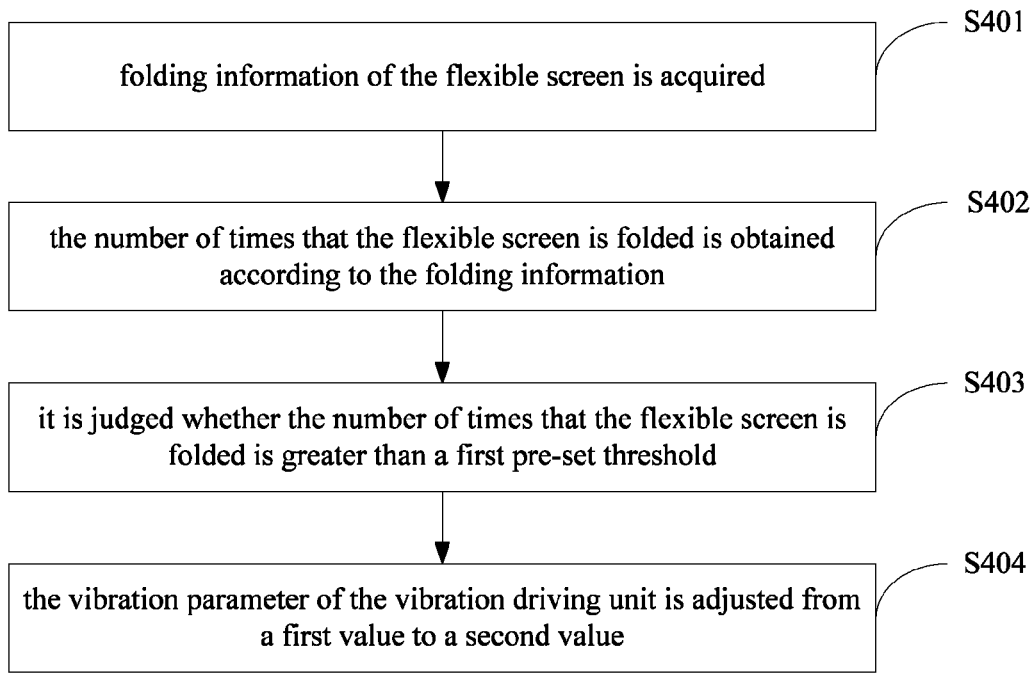
FIG. 4 is a flow chart of a method for controlling vibration according to an embodiment of the disclosure.

FIG. 4 shows a flow chart of a method for controlling vibration according to an embodiment of the disclosure. The method is achieved by steps S401 to S404.

In step S401, folding information of the flexible screen is acquired.

In step S402, the number of times that the flexible screen is folded is obtained according to the folding information.

Steps S401 and S402 are identical with the steps S201 and S202 in the embodiment illustrated by FIG. 2, which will not be described herein.

In step S403, it is determined whether the number of times that the flexible screen is folded is greater than a first pre-set threshold.

In practical application, the first pre-set threshold may be five, six or even larger.

It should be noted that, in the case that the number of layers of the folded flexible screen is lager, the vibration driving unit is wrapped by more layers of the folded flexible screen, and more vibration energy generated by the vibration driving unit is absorbed by the folded flexible screen.

Therefore, the vibration parameter of the vibration driving unit has to be adjusted large, if the number of times that the flexible screen is folded is large.

In step S404, the vibration parameter of the vibration driving unit is adjusted from a first value to a second value, if the number of times that the flexible screen is folded is greater than the first pre-set threshold.

The second value is greater than the first value.

In practical application, the adjustment of the vibration parameter may be the adjustment of the vibration frequency, vibration amplitude and so on of the vibration driving unit.

For example, the adjustment of the vibration frequency may be achieved by adjusting the rotational speed of a motor of the vibration driving unit; the adjustment of the vibration amplitude may be achieved by adjusting the displacement distance of the vibration driving unit.

It should be noted that, two ways are provided in the embodiment to adjust the vibration parameter of the vibration driving unit, but it is not limited thereto. In practical application, other way may be adopted to adjust each vibration parameter of the vibration driving unit.

In the method for controlling vibration according to the embodiment, adjusting a vibration parameter of the vibration driving unit of the electronic device according to the folding parameter includes: determining whether the number of times that the flexible screen is folded is greater than a first pre-set threshold; and adjusting the vibration parameter of the vibration driving unit from a first value to a second value, if the number of times that the flexible screen is folded is greater than the first pre-set threshold; where the second value is greater than the first value. In this method, in a case that the number of times that the flexible screen is folded is greater than the first pre-set threshold, the flexible screen is folded many times, and then the vibration parameter of the vibration driving unit is increased. With this method, each vibration parameter of the vibration driving unit may be adjusted in conjunction with the number of times that the flexible screen is folded, the vibration parameter of the vibration driving unit in the electronic device may be adjusted to different folding states, so that the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

Figure 5:
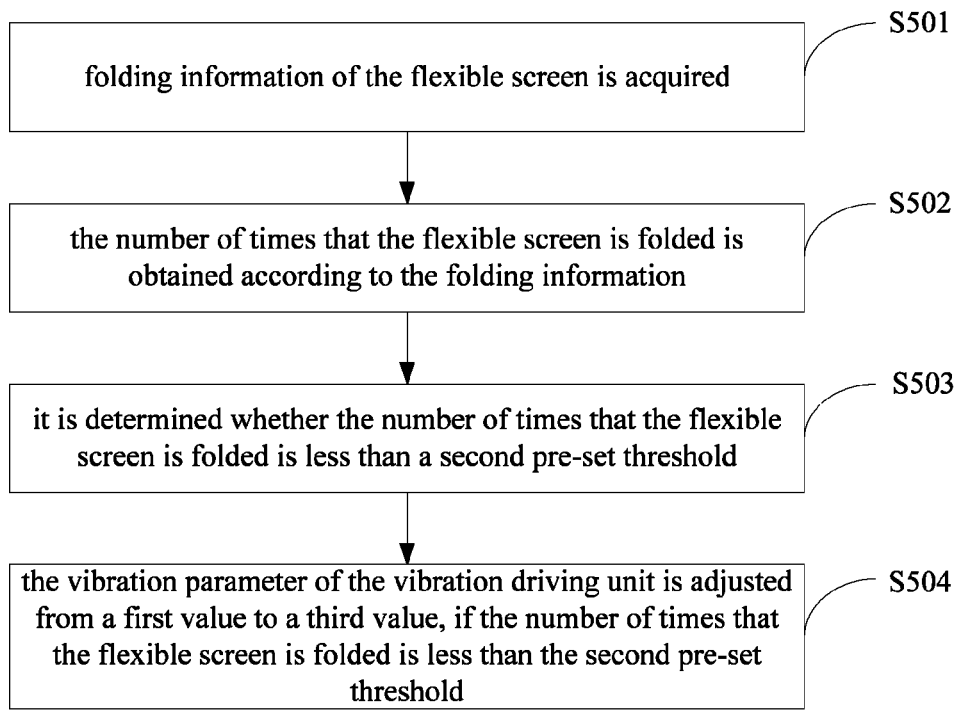
FIG. 5 is a flow chart of a method for controlling vibration according to an embodiment of the disclosure.

FIG. 5 shows a flow chart of a method for controlling vibration according to an embodiment of the disclosure. The method is achieved by steps S501 to S504.

In step S501, folding information of the flexible screen is acquired.

In step S502, the number of times that the flexible screen is folded is obtained according to the folding information.

The steps S501 and S502 are identical with the steps S201 and S202 in the embodiment illustrated by FIG. 2, which will not be described herein.

In step S503, it is determined whether the number of times that the flexible screen is folded is less than a second pre-set threshold.

In practical application, the second pre-set threshold may be one, two or even smaller.

It should be noted that, in the case that the number of layers of the folded flexible screen is smaller, the vibration driving unit is wrapped by less layers of the folded flexible screen, and less vibration energy generated by the vibration driving unit is absorbed by the folded flexible screen.

Even less vibration energy generated by the vibration driving unit can be sensed by the user from outside of the electronic device, in the case that the number of times that the flexible screen is folded is smaller. Therefore, the vibration parameter of the vibration driving unit may be decreased, to reduce the power consumption of the vibration driving unit.

In step S504, the vibration parameter of the vibration driving unit is adjusted from a first value to a third value, if the number of times that the flexible screen is folded is less than the second pre-set threshold.

The third value is less than the first value.

In practical application, the adjustment of the vibration parameter may be adjustment of the vibration frequency, vibration amplitude and so on of the vibration driving unit.

For example, the adjustment of the vibration frequency may be achieved by adjusting the rotational speed of a motor of the vibration driving unit; the adjustment of the vibration amplitude may be achieved by adjusting the displacement distance of the vibration driving unit.

It should be noted that, two ways are provided in the embodiment to adjust the vibration parameter of the vibration driving unit, but it is not limited thereto. In practical application, other way may be adopted to adjust each vibration parameter of the vibration driving unit.

In the method for controlling vibration according to the embodiment, the adjusting a vibration parameter of the vibration driving unit of the electronic device according to the folding parameter includes: determining whether the number of times that the flexible screen is folded is less than a second pre-set threshold; and adjusting the vibration parameter of the vibration driving unit from a first value to a third value, if the number of times that the flexible screen is folded is less than the second pre-set threshold; where the third value is less than the first value. In a case that the number of times that the flexible screen is folded is less than the second pre-set threshold, the flexible screen is folded less times, and then the vibration parameter of the vibration driving unit is reduced. With this method, each vibration parameter of the vibration driving unit may be adjusted in conjunction with the number of times that the flexible screen is folded, the vibration parameter of the vibration driving unit in the electronic device may be adjusted to different folding states, so that the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

The flexible screen of the electronic device is provided with a sensor.

Figure 6:
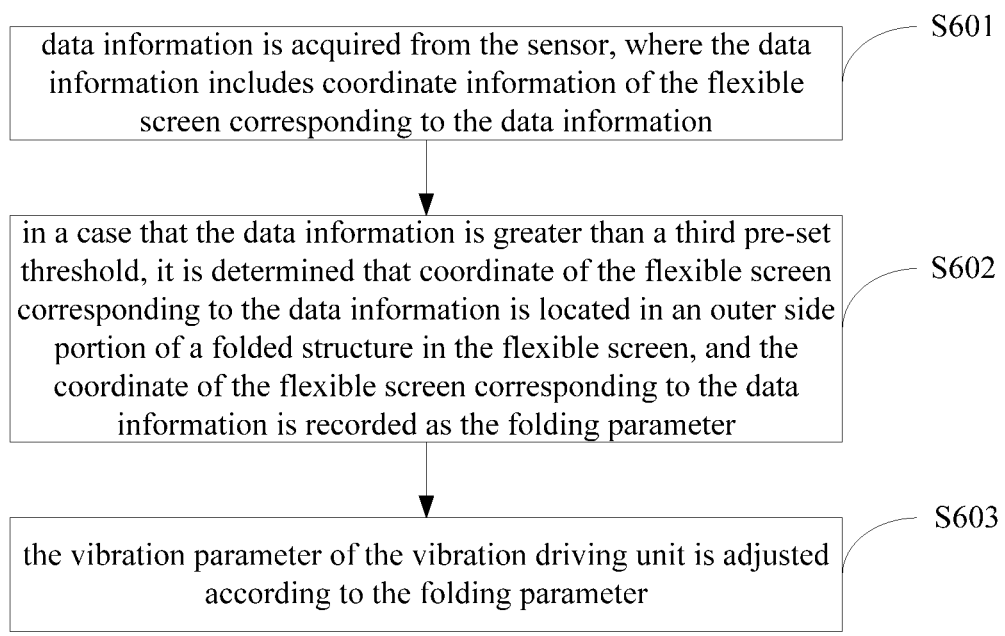
FIG. 6 is a flow chart of a method for controlling vibration according to an embodiment of the disclosure.

FIG. 6 shows a flow chart of a method for controlling vibration according to an embodiment of the disclosure. The method is achieved by steps S601 to S603.

In step S601, data information is acquired from the sensor, where the data information includes coordinate information of the flexible screen corresponding to the data information.

The sensor is provided at a pre-set position of the electronic device and is configured to collect the data information corresponding to the pre-set position. Alternatively, the pre-set position may be a certain position in the electronic device.

The sensor may be an illumination sensor, a proximity sensor, etc.

In a case that the sensor is an illumination sensor, the acquiring data information from the sensor includes: acquiring light intensity information from the illumination sensor, where the light intensity information includes the coordinate information of the flexible screen corresponding to the light intensity information and a light intensity value.

In a case that the sensor is a proximity sensor, the acquiring data information from the sensor includes: acquiring distance information from the proximity sensor, where the distance information includes the coordinate information of the flexible screen corresponding to the distance information and distance between the proximity sensor and an object nearest to the proximity sensor.

In step S602, in a case that the data information is greater than a third pre-set threshold, it is determined that coordinate of the flexible screen corresponding to the data information is located in an outer side portion of a folded structure in the flexible screen, and the coordinate of the flexible screen corresponding to the data information is recorded as the folding parameter.

The third pre-set threshold indicates information relating to a certain position of the flexible screen of the electronic device, such as a threshold of the distance to the object nearest to the proximity sensor or a threshold of the light intensity detected by the illumination sensor.

The case that the data information is greater than the third pre-set threshold indicates that the detection position corresponding to the data information is located in an outer side of the folded structure of the flexible screen. In this case, the data information greater than the third pre-set threshold is recorded.

The coordinate corresponding to the coordinate position of the flexible screen is recorded as the folding parameter of the flexible screen. It can be determined from the folding parameter that the region where the coordinate corresponding to the data information is located is in the outermost layer of the folded structure of the flexible screen. There is no other folding layer outside the region.

It should be noted that, when the outermost region of the folded structure in the flexible screen is determined, the optimum vibration parameter of the vibration driving unit may be calculated based on the coordinate of the outermost region, the position where the vibration driving unit in the electronic device is set, and the specific parameter of the vibration driving unit. The vibration parameter of the vibration driving unit may be adjusted with the optimum vibration parameter, in the following steps.

In step S603, the vibration parameter of the vibration driving unit is adjusted according to the folding parameter.

The step S603 is identical with the step S102 in the embodiment illustrated by FIG. 1, which will not be described herein.

In the method for controlling vibration according to the embodiment, the data information collected by the sensor is analyzed to obtain information of the outermost region of the flexible screen. The optimum vibration parameter of the vibration driving unit may be calculated based on the coordinate of the outermost region, the position where the vibration driving unit is set, and the specific parameter of the vibration driving unit. The vibration parameter of the vibration driving unit may be adjusted with the optimum vibration parameter. With this method, the vibration driving unit may be adjusted in conjunction with the coordinate of the outermost region of the flexible screen, the vibration parameter of the vibration driving unit in the electronic device may be adjusted to different folding states, so that the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

The flexible screen is provided with a vibration driving unit group including at least two vibration driving units.

Figure 7:
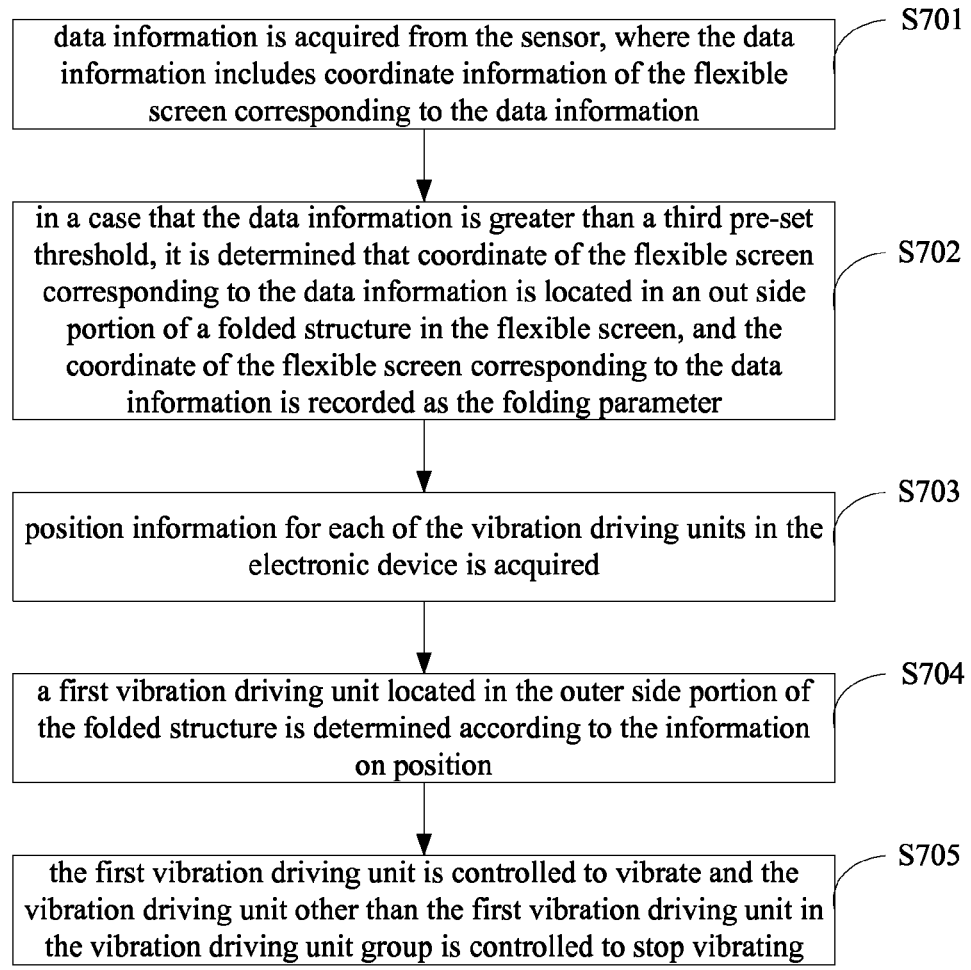
FIG. 7 is a flow chart of a method for controlling vibration according to an embodiment of the disclosure.

FIG. 7 shows a flow chart of a method for controlling vibration according to an embodiment of the disclosure. The method is achieved by steps S701 to S705.

In step S701, data information is acquired from the sensor, where the data information includes coordinate information of the flexible screen corresponding to the data information.

In step S702, in a case that the data information is greater than a third pre-set threshold, it is determined that coordinate of the flexible screen corresponding to the data information is located in an outer side portion of a folded structure in the flexible screen, and the coordinate of the flexible screen corresponding to the data information is recorded as the folding parameter.

The steps S701 and S702 are identical with the steps S601 and S602 in the embodiment illustrated by FIG. 6, which will not be described herein.

In step S703, position information for each of the vibration driving units in the electronic device is acquired.

Multiple vibration driving units are pre-set in the electronic device. Any of the vibration driving units may be controlled to operate according to different situations, to make the electronic device vibrate.

In practical application, relating parameters of hardware devices in the electronic device may be pre-set in the electronic device. The relating parameters may include mounting position, an initial parameter, a setting parameter, etc.

The position information of each vibration driving unit may be obtained from a hardware parameter list in a memory of the electronic device.

It should be noted that the position information of the vibration driving unit includes coordinate information and identification information. For example, the coordinate of No. 01 vibration driving unit in the electronic device is (10, 20, 5) in the unit of millimeter. This coordinate indicates that, the coordinate of the vibration driving unit in the plane in which the flexible screen is located is (10, 20), and the distance between the vibration driving unit and the surface of the flexible screen of the electronic device, when the flexible screen is not folded.

In step S704, a first vibration driving unit located in the outer side portion of the folded structure is determined, according to the position information.

The following information may be determined from the obtained position information: the coordinate of the vibration driving unit in the plane in which the flexible screen is located, and the distance between the vibration driving unit and the surface of the flexible screen of the electronic device, when the flexible screen is not folded.

The folding state of the flexible screen may be determined from the folding parameter of the electronic device. The position of the vibration driving unit in the folded structure when the flexible screen is folded may be determined from the folding state and the position information of the vibration driving unit.

It should be noted that, the positions of the vibration driving units in the folded structure are compared after the positions of the vibration driving units in the folded structure when the flexible screen is folded is determined, to determine a vibration driving unit with a minimum distance from the outer side portion of the folded structure and record the vibration driving unit as a first vibration driving unit.

In practical application, the first vibration driving unit may be located in the outermost layer of the folded structure. Alternatively, the first vibration driving unit may be located closer to the outer side of the folded structure, compared with other vibration driving units.

In step S705, the first vibration driving unit is controlled to vibrate and the vibration driving unit other than the first vibration driving unit in the vibration driving unit group is controlled to stop vibrating.

After the first vibration driving unit with a minimum distance from the outer side portion of the folded structure is determined, the first vibration driving unit is controlled to vibrate and most of the vibration energy generated when the first vibration driving unit vibrates cannot be absorbed by the flexible screen, and the vibration can be sensed from outside by the user.

In the case that the energy generated when the first vibration driving unit vibrates can be sensed by the user, the vibration driving unit other than the first vibration driving unit among the vibration driving units does not have to vibrate, to reduce the power consumption of the electronic device.

It should be noted that, in the case that there are multiple vibration driving units with a minimum distance from the outer side portion of the folded structure, one or two vibration driving units may be selected as required from the multiple vibration driving units as the first vibration driving unit(s).

In the method for controlling vibration according to the embodiment, the flexible screen may be provided with the vibration driving unit group including at least two vibration driving units. The vibration driving unit located nearest to the outer side portion of the folded structure may be determined from the position information of the multiple vibration driving units provided in the electronic device, and the energy generated by the vibration of this vibration driving unit can be sensed by the user. The vibration driving unit other than the first vibration driving unit among the vibration driving units may not vibrate, to reduce the power consumption of the electronic device. Therefore, the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

The method for controlling vibration according to the above-mentioned embodiments of the disclosure is described in detail. The method for controlling vibration according to the disclosure may be embodied in various forms of electronic device. Correspondingly, there is further provided an electronic device which applies the method for controlling vibration. The embodiments of the electronic device are described in detail as follows.

Figure 8:
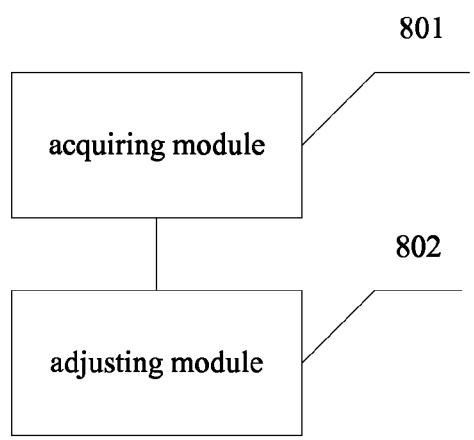
FIG. 8 is a structural schematic diagram of an electronic device according to an embodiment of the disclosure.

FIG. 8 shows a structural schematic diagram of an electronic device according to an embodiment of the disclosure. The electronic device includes a flexible screen and a vibration driving unit. The vibration driving unit may vibrate according to a vibration state parameter. The electronic device may be a desktop, a notebook, a tablet PC, a mobile phone, a smart TV, a smart watch, a wearable device, etc.

The electronic device further includes an acquiring module 801 an adjusting module 802.

The acquiring module 801 is configured to acquire a folding parameter of the flexible screen.

The adjusting module 802 is configured to adjust a vibration parameter of the vibration driving unit according to the folding parameter.

In practical application, the acquiring module and the adjusting module may be composition of a processor of the electronic device.

In the electronic device according to the embodiment, the folding parameter of the flexible screen is acquired and the vibration parameter of the vibration driving unit in the electronic device is adjusted according to the folding parameter. Thereby, the vibration parameter of the vibration driving unit in the electronic device may be adjusted to different folding states, so that the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

The flexible screen of the electronic device is provided with a folding sensor for sensing folding information.

Figure 9:
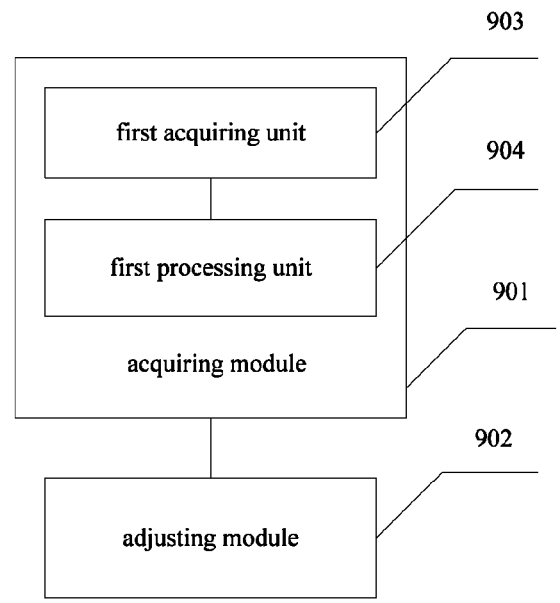
FIG. 9 is a structural schematic diagram of an electronic device according to an embodiment of the disclosure.

FIG. 9 shows a structural schematic diagram of an electronic device according to an embodiment of the disclosure. The electronic device further includes an acquiring module 901 and an adjusting module 902.

The acquiring module 901 includes a first acquiring unit 903 and a first processing unit 904.

The adjusting module is identical with the corresponding structural function described in the embodiment illustrated by FIG. 8, which will not be described herein.

The first acquiring unit 903 is configured to acquire the folding information from the folding sensor.

The first processing unit 904 is configured to obtain the number of times that the flexible screen is folded, according to the folding information.

In practical application, the electronic device is further provided with a counter. The first processing unit 904 is configured to: determine whether the folding information is received for the first time; and control a counting number in the counter to be 1, if the folding information is received for the first time; judge whether the folding information is received again in a pre-set time period, if the folding information is not received for the first time; control the counting number in the counter to be incremented, if the folding information is received again in the pre-set time period; and determine the counting number in the counter as the number of times that the flexible screen is folded, if no folding information is received in the pre-set time period.

It should be noted that, in practical application, the counting number in the counter is reset, that is, the counting number is set to be zero, after the counting number in the counter is determined as the number of times that the flexible screen is folded. In this way, the counter may be reused without affecting the counting result of the next counting.

In the electronic device according to the embodiment, the flexible screen of the electronic device is provided with the folding sensor for sensing the folding information. The number of times that the flexible screen is folded is obtained by analyzing the folding information collected by the folding sensor, and the vibration parameter of the vibration driving unit is adjusted according to the number of times that the flexible screen is folded. Thereby, the vibration driving unit is adjusted in conjunction with the number of times that the flexible screen is folded, the vibration parameter of the vibration driving unit in the electronic device may be adjusted to different folding states, so that the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

Figure 10:
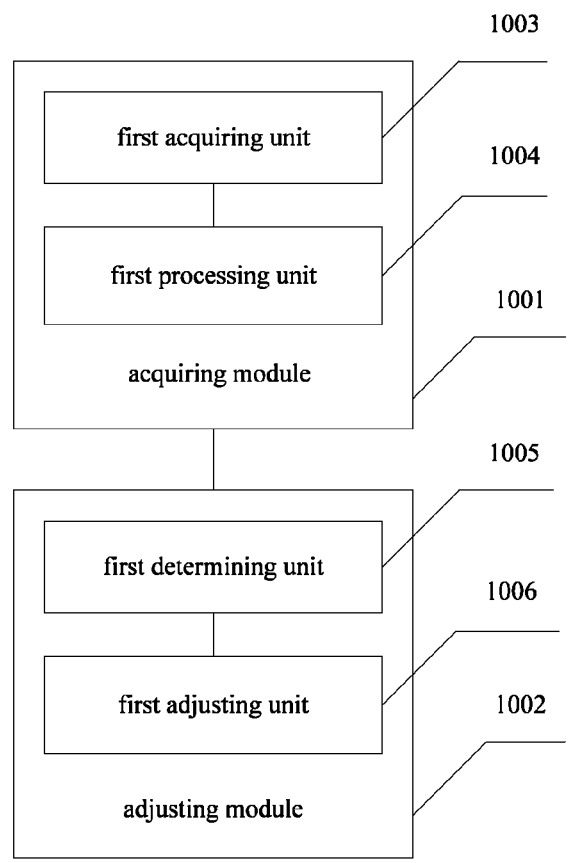
FIG. 10 is a structural schematic diagram of an electronic device according to an embodiment of the disclosure.

FIG. 10 shows a structural schematic diagram of an electronic device according to an embodiment of the disclosure. The electronic device further includes an acquiring module 1001 and an adjusting module 1002.

The acquiring module 1001 includes a first acquiring unit 1003 and a first processing unit 1004.

The adjusting module 1002 includes a first determining unit 1005 and a first adjusting unit 1006.

The adjusting module 1002 is identical with the corresponding structural function described in the embodiment illustrated by FIG. 9, which will not be described herein.

The first determining unit 1005 is configured to determine whether the number of times that the flexible screen is folded is greater than a first pre-set threshold.

The first adjusting unit 1006 is configured to adjust the vibration parameter of the vibration driving unit from a first value to a second value, if the number of times that the flexible screen is folded is greater than the first pre-set threshold.

The second value is greater than the first value.

In the electronic device according to the embodiment, in a case that the number of times that the flexible screen is folded is greater than the first pre-set threshold, the flexible screen is folded many times, and then the vibration parameter of the vibration driving unit is increased. With this method, each vibration parameter of the vibration driving unit may be adjusted in conjunction with the number of times that the flexible screen is folded, the vibration parameter of the vibration driving unit in the electronic device may be adjusted to different folding states, so that the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

Figure 11:
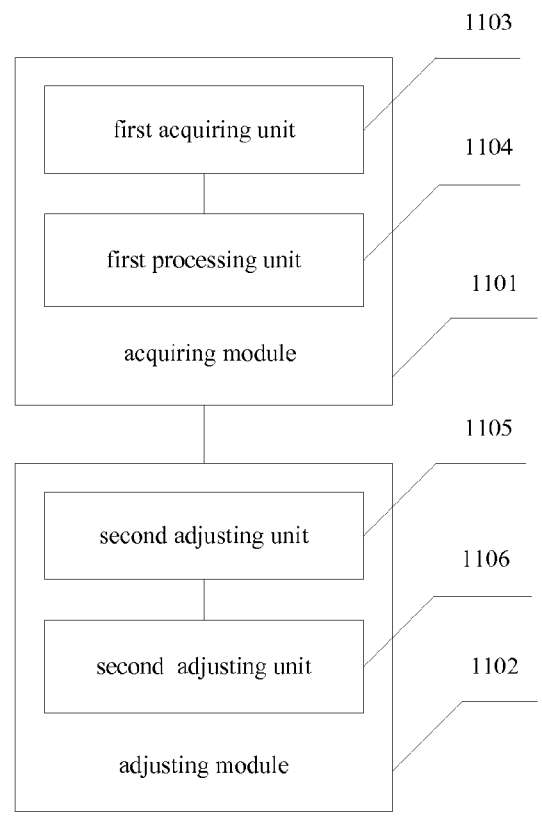
FIG. 11 is a structural schematic diagram of an electronic device according to an embodiment of the disclosure.

FIG. 11 shows a structural schematic diagram of an electronic device according to an embodiment of the disclosure. The electronic device includes an acquiring module 1101 and an adjusting module 1102.

The acquiring module 1101 includes a first acquiring unit 1103 and a first processing unit 1104.

The adjusting module 1102 includes a second determining unit 1105 and a second adjusting unit 1106.

The adjusting module 1102 is identical with the corresponding structural function described in the embodiment illustrated by FIG. 9, which will not be described herein.

The second determining unit 1105 is configured to determine whether the number of times that the flexible screen is folded is less than a second pre-set threshold.

The second adjusting unit 1106 is configured to adjust the vibration parameter of the vibration driving unit from a first value to a third value, if the number of times that the flexible screen is folded is less than the second pre-set threshold.

The third value is less than the first value.

In the electronic device according to the embodiment, in a case that the number of times that the flexible screen is folded is less than the second pre-set threshold, the flexible screen is folded less times, and then the vibration parameter of the vibration driving unit is reduced. With this electronic device, each vibration parameter of the vibration driving unit may be adjusted in conjunction with the number of times that the flexible screen is folded, the vibration parameter of the vibration driving unit in the electronic device may be adjusted to different folding states, so that the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

The flexible screen of the electronic device is provided with a sensor.

Figure 12:
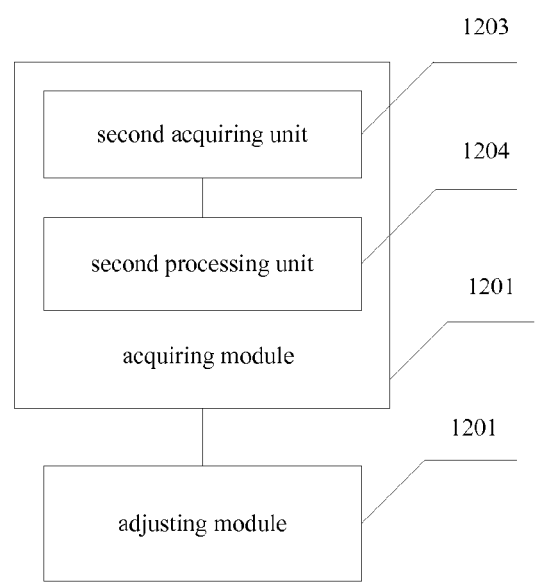
FIG. 12 is a structural schematic diagram of an electronic device according to an embodiment of the disclosure.

FIG. 12 shows a structural schematic diagram of an electronic device according to an embodiment of the disclosure. The electronic device includes an acquiring module 1201 and an adjusting module 1202.

The acquiring module 1202 includes a second acquiring unit 1203 and a second processing unit 1204.

The adjusting module 1202 is identical with the corresponding structural function described in the embodiment illustrated by FIG. 8, which will not be described herein.

The second acquiring unit 1203 is configured to acquire data information from the sensor, where the data information includes coordinate information of the flexible screen corresponding to the data information.

The second processing unit 1204 is configured to in a case that the data information is greater than a third pre-set threshold, determine that coordinate of the flexible screen corresponding to the data information is located in an outer side portion of a folded structure in the flexible screen, and record the coordinate of the flexible screen corresponding to the data information as the folding parameter.

In a case that the sensor is an illumination sensor, the second acquiring unit is configured to acquire light intensity information from the illumination sensor, where the light intensity information includes the coordinate information of the flexible screen corresponding to the light intensity information and a light intensity value.

In a case that the sensor is a proximity sensor, the second acquiring unit is configured to acquire distance information from the proximity sensor, where the distance information includes the coordinate information of the flexible screen corresponding to the distance information and distance between the proximity sensor and an object nearest to the proximity sensor.

In the electronic device according to the embodiment, the data information collected by the sensor is analyzed to obtain information of the outermost region of the flexible screen. The optimum vibration parameter of the vibration driving unit may be calculated based on the coordinate of the outermost region, the position where the vibration driving unit is set, and the specific parameter of the vibration driving unit. The vibration parameter of the vibration driving unit may be adjusted with the optimum vibration parameter. With this electronic device, the vibration driving unit may be adjusted in conjunction with the coordinate of the outermost region of the flexible screen, the vibration parameter of the vibration driving unit in the electronic device may be adjusted to different folding states, so that the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

The flexible screen may be provided with a vibration driving unit group including at least two vibration driving units.

Figure 13:
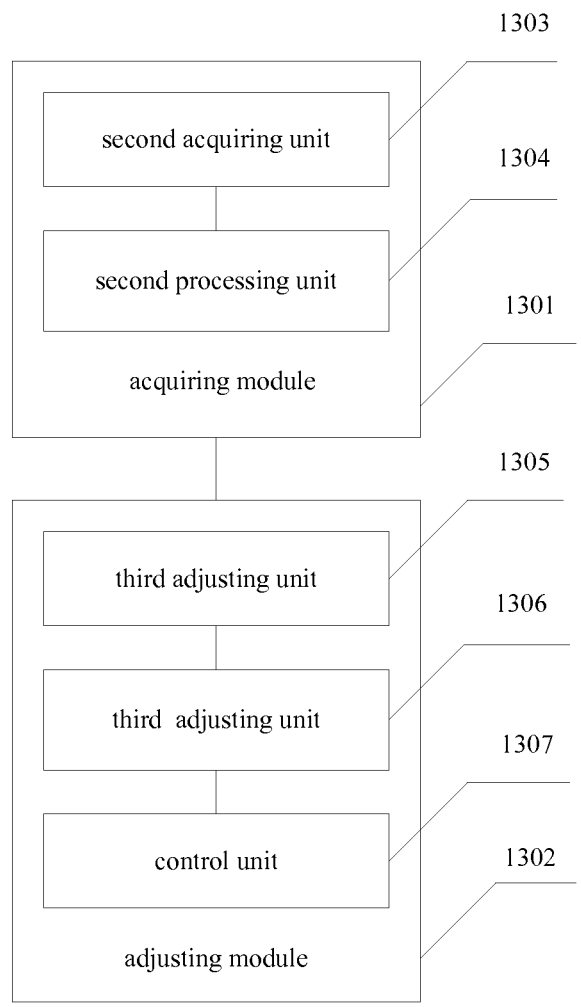
FIG. 13 is a structural schematic diagram of an electronic device according to an embodiment of the disclosure.

FIG. 13 shows a structural schematic diagram of an electronic device according to an embodiment of the disclosure. The electronic device includes an acquiring module 1301 and an adjusting module 1302.

The acquiring module 1301 includes a second acquiring unit 1303 and a second processing unit 1304.

The adjusting module 1302 includes a third acquiring unit 1305, a third processing unit 1306 and a control unit 1307.

The acquiring module 1301 is identical with the corresponding structural function described in the embodiment illustrated by FIG. 12, which will not be described herein.

The third acquiring unit 1305 is configured to, for each vibration driving unit in the vibration driving unit group, acquire position information for each of the vibration driving units in the electronic device.

The third processing unit 1306 is configured to, determine a first vibration driving unit located in the outer side portion of the folded structure, according to the position information.

The control unit 1307 is configured to control the first vibration driving unit to vibrate and control the vibration driving unit other than the first vibration driving unit in the vibration driving unit group to stop vibrating.

In the electronic device according to the embodiment, the flexible screen may be provided with the vibration driving unit group including at least two vibration driving units. The vibration driving unit located nearest to the outer side portion of the folded structure may be determined from the position information of the multiple vibration driving units provided in the electronic device, and the energy generated by the vibration of this vibration driving unit can be sensed by the user. The vibration driving unit other than the first vibration driving unit among the vibration driving units may not vibrate, to reduce the power consumption of the electronic device. Therefore, the vibration of the vibration driving unit changes as the folding state of the flexible screen of the electronic device changes, it is ensured that the vibration energy generated by the vibration driving unit cannot be completely absorbed by the flexible screen, and the object is achieved that the vibration of the electronic device can be sensed outside the electronic device from an ergonomic point of view.

The embodiments are described in the specification in a progressive way, with emphasis of one embodiment on the difference from other embodiments. Therefore, one embodiment may refer to the same or similar parts of other embodiments. The description of the device embodiments corresponding to the method embodiments is relatively simple and the relevant portion thereof may refer to the explanation of the method.

It should be noted that, the relationship terminologies such as first and second and the like are only used herein to distinguish an entity or operation from another entity or operation, and it is not necessarily required or implied that there are any actual relationship or order of this kind between those entities and operations. Moreover, the terminologies of 'comprise', 'include', and any other variants are intended to cover the non-exclusive contains so that the processes, methods, articles or equipment including a series of elements not only include those elements but also include other elements that are not listed definitely or also include the elements inherent in the processes, methods, articles or equipment. In the case of no more restrictions, the elements defined by the statement 'include one . . . ' do not exclude that other same elements also exist in the processes, methods, articles or equipment including the elements.

The method for controlling vibration and the electronic device according to the disclosure are described in details in the above. Herein, the principles and embodiments of the disclosure are described by using specific embodiments. The above description of the embodiments is only for helping understanding the method and core concept of the disclosure. Changes can be made to the embodiments and application filed of the present disclosure by those skilled in the art in light of the concept of the disclosure. Therefore, the description shall not be interpreted as limiting the scope of the disclosure.

The invention claimed is:

1. A method for controlling vibration of an electronic device having a flexible screen and a vibration driving unit, the method comprising:
    acquiring a folding parameter of the flexible screen; and
    adjusting a vibration parameter of the vibration driving unit according to the folding parameter;
    wherein the flexible screen of the electronic device is provided with a folding sensor for sensing folding information, and acquiring the folding parameter of the flexible screen comprises:
    acquiring the folding information from the folding sensor; and
    obtaining the number of times that the flexible screen is folded, according to the folding information.

2. The method according to claim 1, wherein the electronic device is provided with a counter, and obtaining the number of times that the flexible screen is folded according to the folding information comprises:
    determining whether the folding information is received for the first time;
    controlling a counting number in the counter to be 1, if the folding information is received for the first time;
    determining whether the folding information is received again in a pre-set time period, if the folding information is not received for the first time;
    controlling the counting number in the counter to be incremented, if the folding information is received again in the pre-set time period; and
    determining the counting number in the counter as the number of times that the flexible screen is folded, if no folding information is received in the pre-set time period.

3. The method according to claim 2, further comprising: resetting the counting number in the counter, after determining the counting number in the counter as the number of times that the flexible screen is folded.

4. The method according to claim 1, wherein adjusting the vibration parameter of the vibration driving unit of the electronic device according to the folding parameter comprises:
    determining whether the number of times that the flexible screen is folded is greater than a pre-set threshold; and
    adjusting the vibration parameter of the vibration driving unit from a first value to a second value, if the number of times that the flexible screen is folded is greater than the pre-set threshold;
    wherein the second value is greater than the first value.

5. The method according to claim 1, wherein adjusting the vibration parameter of the vibration driving unit of the electronic device according to the folding parameter comprises:
    determining whether the number of times that the flexible screen is folded is less than a pre-set threshold; and adjusting the vibration parameter of the vibration driving unit from a first value to a second value, if the number of times that the flexible screen is folded is less than the pre-set threshold;

wherein the second value is less than the first value.

6. An electronic device, comprising:
a flexible screen;
a vibration driving unit;
an acquiring module configured to acquire a folding parameter of the flexible screen; and
an adjusting module configured to adjust a vibration parameter of the vibration driving unit according to the folding parameter;
wherein the flexible screen of the electronic device is provided with a folding sensor for sensing folding information, and the acquiring module comprises:
a first acquiring unit; configured to acquire the folding information from the folding sensor; and
a first processing unit; configured to obtain the number of times that the flexible screen is folded, according to the folding information.

7. The electronic device according to claim 6, wherein the electronic device is provided with a counter, and the first processing unit is configured to:
determine whether the folding information is received for the first time;
control a counting number in the counter to be 1, if the folding information is received for the first time;
determine whether the folding information is received again in a pre-set time period, if the folding information is not received for the first timer;
control the counting number in the counter to be incremented, if the folding information is received again in the pre-set time period; and
determine the counting number in the counter as the number of times that the flexible screen is folded, if no folding information is received in the pre-set time period.

8. The electronic device according to claim 6, wherein the adjusting module comprises:
a first determining unit configured to determine whether the number of times that the flexible screen is folded is greater than a pre-set threshold; and
a first adjusting unit, configured to adjust the vibration parameter of the vibration driving unit from a first value to a second value, if the number of times that the flexible screen is folded is greater than the pre-set threshold;
wherein the second value is greater than the first value.

9. The electronic device according to claim 6, wherein the adjusting module comprises:
a second determining unit, configured to determine whether the number of times that the flexible screen is folded is less than a pre-set threshold; and
a second adjusting unit; configured to adjust the vibration parameter of the vibration driving unit from a first value to a second value, if the number of times that the flexible screen is folded is less than the pre-set threshold;
wherein the second value is less than the first value.

* * * * *